Nov. 30, 1965 N. WORTHING 3,220,373
AUTOMATIC PILOT MECHANISM
Filed Nov. 26, 1963 10 Sheets-Sheet 1

FIG. 1.(a)

Inventor:
Nicolas Worthing
BY Baldwin & Wright
Attorneys

United States Patent Office 3,220,373
Patented Nov. 30, 1965

1

3,220,373
AUTOMATIC PILOT MECHANISM
Nicolas Worthing, London, England, assignor to The Harland Engineering Company Limited, Alloa, Scotland, a corporation of the United Kingdom
Filed Nov. 26, 1963, Ser. No. 326,183
Claims priority, application Great Britain, Nov. 30, 1962, 45,378/62
19 Claims. (Cl. 114—144)

This invention relates to an automatic pilot mechanism for ships, that term including surface craft and submarines. An automatic pilot mechanism for a surface craft need only steer the craft along a pre-set or chosen course but for a submarine the pilot mechanism must be capable of guiding the submarine along a pre-set path in the vertical plane and also, if desired, in the horizontal plane. In the detailed description, which follows below, the present invention has been described with reference to a submarine but it is to be understood that the automatic steering control may be used on its own in a submarine or a surface craft.

According to the present invention an automatic pilot mechanism for a ship, comprises responsive means sensitive to any deviation of the ship from a pre-selected path and adapted, through mechanical and hydraulic connections, to control operation of a servo actuator for adjusting and controlling the setting of the control surface of the ship in accordance with the extent of deviation from the pre-selected path, and a hydraulically operated phase advancer between the responsive means and the servo actuator to anticipate the maneuver necessary to bring the ship on path.

The control surfaces, in the case of a surface craft, would be the rudder whilst in the case of a submarine the control surfaces would be the rudder and/or the hydroplanes.

The automatic pilot mechanism may include means responsive to depth error and means responsive to course error, each means being coupled mechanically and hydraulically through a hydraulic phase advancer, to a servo actuator adapted to control and adjust the hydroplanes or the rudder, as the case may be, of a submarine.

In the case of the mechanism for controlling the depth of the submarine, means may be provided for limiting the angle of pitch of the submarine as it is maneuvered from one selected depth to another selected depth.

An embodiment of the present invention is now described by way of example as applied to a submarine, with reference to the accompanying drawings in which.

2

Figure 1:
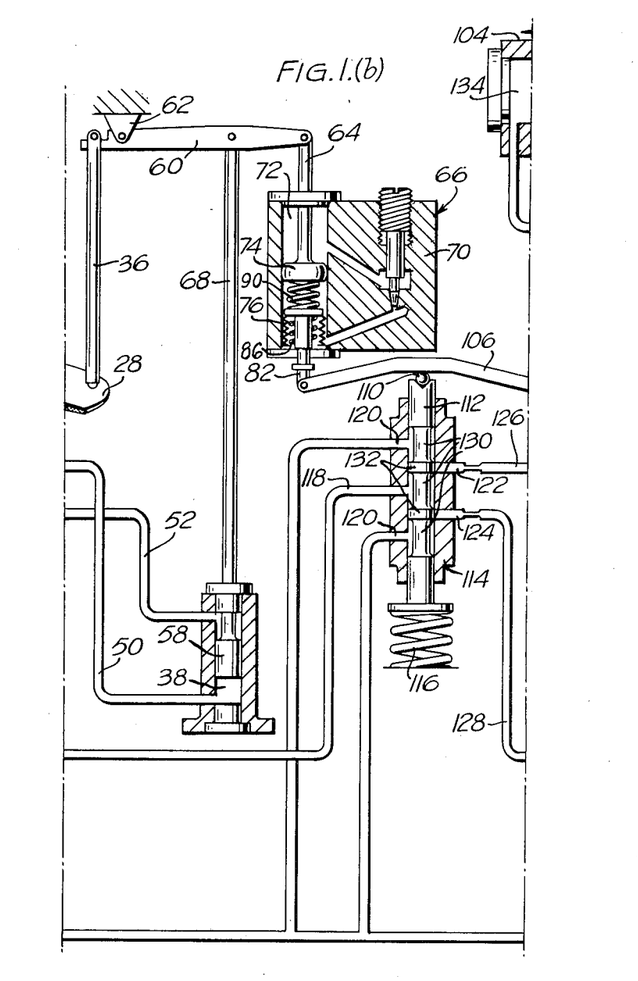
FIGURES 1(a), 1(b) and 1(c), considered connected together, constitute a schematic diagram of the depth control mechanism of the automatic pilot. These figures, in connected relation, will hereinafter be referred to as "FIGURE 1,"
Figure 1A:
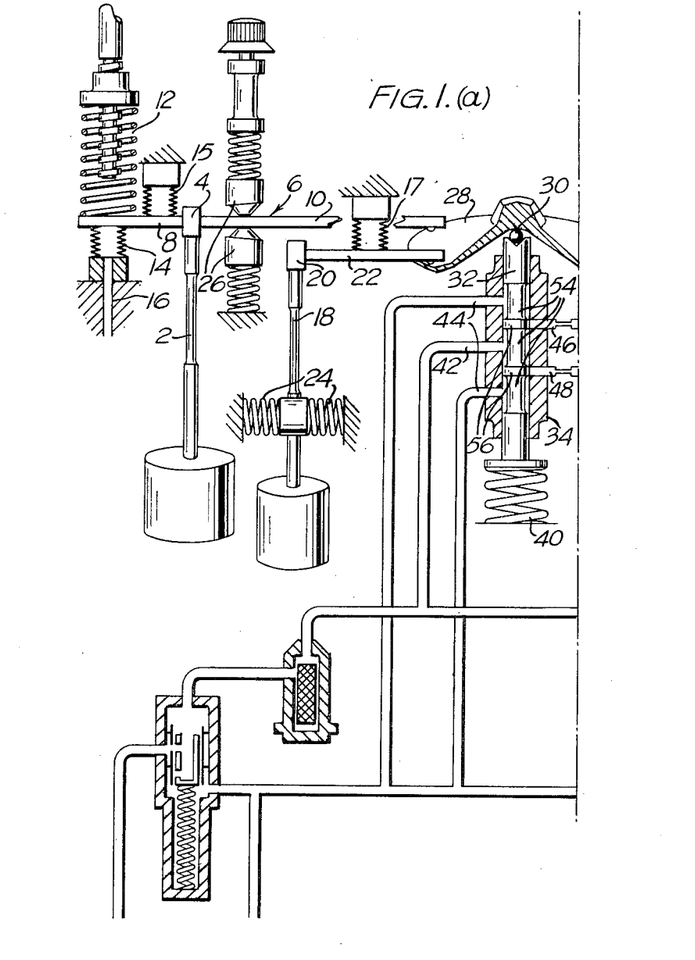

Referring to FIGURE 1, a main pendulum 2 is pivoted at 4 so that the pendulum weight can swing fore and aft with respect to the submarine hull. Across the top of the pendulum arm 2 is a cross beam 6 which can be considered as being divided into a forearm 8 and an aft arm 10.

A compression coil spring 12 bears down against the forearm 8 and its pressure or force is adjusted by a screw mechanism (not shown). This spring serves as depth control by adjusting the screw mechanism whereby the compression coil spring 12 applies a downward force to the forearm 8 related to the depth at which it is desired the submarine should sail.

Depth sensing bellows 14 act upwardly on the forearm 8 and are in open communication through a passageway 16 to sea pressure external of the pressure hull of the submarine. It will be appreciated that the sea pressure in the bellows 14 acts against the force of the compression spring 12 so that the resultant force is proportional to the depth error of the submarine above or below the selected depth.

It will be appreciated that compensation must be made for the atmospheric pressure inside the submarine so that this has no effect on the balance of the pendulum 2. Compensation is obtained by another bellows 15 acting down on the forearm 8 along side the compression coil spring 12. This other bellows 15 communicates through a throttle with a sealed cup containing silicone fluid and air. The areas of the sea bellows 14 and the compensating bellows 15 are equal and the latter is sealed at constant mean pressure. It follows, therefore, that changes in atmospheric pressure inside the submarine have no effect on the balance of the beam 6. The compensating bellows 15 performs a second function in that the viscous friction in the throttle between said bellows and the sealed cup damps out any tendency of the pendulum 2 to oscillate at its own natural frequency.

An auxiliary pendulum 18 is pivoted at 20 for fore and aft movement with respect to the hull of the submarine. This auxiliary pendulum 18 is provided with a single aft arm 22. The aft arm 10 of the pendulum 2 and the aft arm 22 of the pendulum 18 lie in the same horizontal plane. A pair of compression coil springs 24 act on the auxiliary pendulum 18 and tend to recentre it so that its movement, even for large angles of pitch of the submarine, is quite small. The auxiliary pendulum 18 also is provided with damping bellows 17, throttle and cup (not shown) similar to those of the main pendulum 2, but in this case the cup is vented to atmosphere since there is no other bellows to compensate.

In FIGURE 1, the two pendulums 2 and 18 are shown as pivoted at 4 and 20 on fixed pivot pins. In practice, however, four steel strip hinges would be used. These are guarded against damage by lateral shocks by providing side guides (not shown) for the pendulums.

Stops 26 are provided for the aft arm 10 of the main pendulum 2 and the spacing of these is adjustable. They serve to limit pitch angle of the submarine as will be described.

The free ends of the aft arms 10 and 22 of the pendulums 2 and 18 bear down against a summation disc 28 pivoted at its centre on a steel ball 30 on the end of a vertical plunger 32 of a primary pilot valve 34 so that it can swing in all directions from its normal horizontal position. The plunger 32 is sprung upwards and tends to lift the disc 28, but the disc is restrained downwards at three points 120° apart near its periphery. Two of these restraining elements are the aft arms 10 and 22 and the third is a return motion rod element 36 of a primary servo ram 38.

Upward bias of the plunger 32 is by a compression coil spring 40. The pilot valve 34 is provided with a fluid pressure inlet port 42 and two fluid exhaust ports 44. It is also provided with outlet ports 46 and 48 which are connected to lines 50 and 52 communicating respectively with the bottom and top end of the primary servo ram 38. The plunger 32 is formed with annular chambers 54 separated by lands 56. From examination of FIGURE 1 it will be seen that upon downward movement of the plunger 32 the bottom end of the primary servo ram 38 is connected to exhaust and the top end is connected to fluid pressure; on upward movement of the plunger 32 the reverse occurs. Thus fluid pressure is applied above or below a piston 58 of the primary servo ram 38.

The return motion rod 36 is pivotally connected at its top end to a beam 60 mounted on a fixed pivot 62. At its end remote from the pivotal connection to the return motion rod 36, the beam 60 is connected to a piston rod 64 of a phase advancer 66. The beam 60 between its pivotal mounting 62 and its point of connection to the piston rod 64 is connected to a piston rod 68 of the primary servo ram 38.

It will be described later that the primary servo ram 38 is automatically positioned according to the depth error at a point a fixed distance forward on the axis of the submarine. If the hydroplanes through suitable operating mechanism were coupled directly to the primary servo ram 38 the control of the submarine would not be suitable on account of the inertia of the submarine and also the inevitable lag of the hydroplanes in adopting a new setting. The phase advancer 66 is, therefore, provided to cause a secondary servo ram 104 to be positioned in anticipation of the error. This advancer 66 is a purely hydraulic device and its input rod 64, as mentioned above, is coupled by the beam 60 to the primary servo ram 38. Its output movement, through an output rod 82, is in phase advance of the input and positions the secondary servo ram 104 through a secondary pilot valve 114 accordingly. The operating mechanism of the hydroplanes is coupled to the secondary servo ram and moves in phase advance of the depth error at a point a fixed distance forward on the axis of the submarine.

The present invention is not limited to use with any one particular construction of mechanism operating the hydroplanes and it is envisaged that such could comprise two joy sticks each capable of forward and aft rocking motion to control the setting of the hydroplanes and each provided with a steering wheel to control the setting of the rudder. Each joy stick and steering wheel would be coupled through a hydraulic and/or electrical servo mechanism to the hydroplanes and rudder respectively whereby the angle of inclination of the hydroplanes is in accordance with the inclination of either or both joy sticks and the degree of turn of the rudder is in accordance with the angle of rotation of either or both steering wheels. Each joy stick and each steering wheel may be disengaged from the servo mechanism whereby the automatic pilot mechanism of the present invention may control all maneuvers of the submarine or with the pilot mechanism disengaged manual control may be had by one operator using one joy stick and steering wheel carried thereby or two operators one using one joy stick and the other using the steering wheel of the other joy stick.

Figure 3:
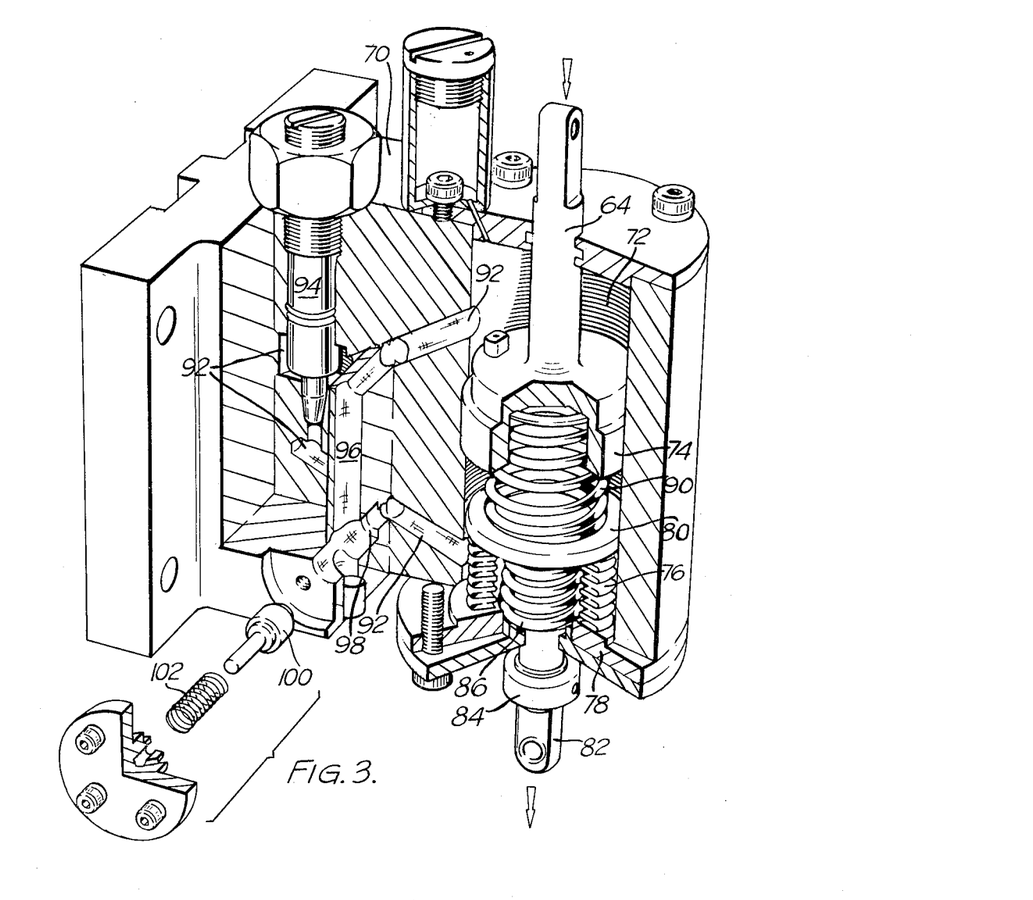
FIGURE 3 is a perspective view, with parts broken away, of a phase advancer.

The phase advancer 66 comprises a body 70 formed with a cylinder 72 in which a piston 74, connected to the piston rod 64, can slide. Referring to FIGURE 3, bellows 76 are contained in the bottom end of the cylinder 72, a fixed end plate 78 of the bellows closing the bottom of said cylinder 72. A top free end plate 80 of the bellows carries the output rod 82 formed with a stop 84. A compression coil spring 86 is trapped between the fixed end plate 78 and the free end plate 80 of the bellows 76. A compression coil spring 90 is trapped between the piston 74 and the free end plate 80 of the bellows 76. The combined rate of the spring 86 and the bellows 76 is several times stiffer than the spring 90. The top of the cylinder 72 is in communication with the bottom of the cylinder through a fluid passageway 92 provided with a throttle plug 94. A passage 96 by-passes the throttle 94 and is formed with a seating 98 for a relief valve 100 biased closed by a coil spring 102 (the valve 100 and spring 102 are shown in exploded relation with respect to the seating 98 in FIGURE 3). There is another similar biased relief valve permitting flow in the opposite direction.

Movement of the output rod 82 is limited by the stop 84 and the input, i.e. piston rod 64 has a full stroke several times larger.

The operation of the phase advancer 66 is as follows. Suppose the throttle 94 is wide open and the input piston rod 64 is slowly oscillated through its full stroke. When input rod 64 is moved slowly, hydraulic forces can be disregarded, and output rod 82 takes a position for which the force in spring 90 is equal to the force in spring 86. The output rod 82 will thus oscillate through its full stroke to satisfy the relative spring rates of the springs 86 and 90, and there will be no phase advance. If, however, the throttle is almost closed then the output rod will complete its full travel in the first portion of the input stroke, because the volume swept by piston 74 is many times larger than the volume swept by the moving bellows and hardly any of the excess liquid can flow through the restricting throttle, with the result that the bellows 76 will give away to the pressure or vacuum created in the lower part of the cylinder 72. Of course, pressure is produced by downward movement of piston 74, and vacuum by upward movement thereof. The remainder of the input stroke can be completed because the relief valve 100, bypassing the throttle 94, opens after the output reaches its stop. The output rod 82 now anticipates movement of the input piston rod 64 by nearly 90° of phase angle.

It is more convenient to express the phase advance in terms of time rather than angle. The throttle 94 is set to give an advance of a preselected number of seconds which means that the output of a phase advancer 66 is equal to the input plus the said number of seconds times the rate of change of input. This phase advance may be varied according to the performance characteristics of a particular submarine.

Returning to FIGURE 1 the output rod 82 of the phase advancer 66 is coupled to one end of a differential beam 106, the other end of which is coupled to a cranked lever 142 of a return motion linkage of the servo actuator 104. The differential beam 106 is balanced at its centre on a steel ball 110 at the top end of a plunger 112 of a secondary pilot valve 114. The plunger 112 is biased upwardly by a compression coil spring 116. This secondary pilot valve 114 is provided with fluid pressure inlet port 118 and fluid exhaust ports 120. The valve is also provided with fluid outlet ports 122 and 124 connected to lines 126 and 128 respectively which, through a plunger type on/off valve 123 communicate with lines 125 and 127 leading to the fore end and the aft end of the secondary servo ram 104. The plunger 112 of the secondary pilot valve has annular chambers 130 separated by lands 132. Referring to FIGURE 1, it will be seen that if the plunger 112 moves up one end of the secondary servo ram 104 is connected to fluid pressure and the other end is connected to exhaust, so that the ram actuates the hydroplanes in the dive direction. The reverse occurs when the plunger 112 moves down.

Fluid lines 129, 131 leading to exhaust are connected to the on/off valve 123 which includes a plunger 133 formed with annular chambers 135. By appropriately positioning the plunger 133, the lines 125 and 127 may be brought into communication with the lines 126 and 128 and hence the secondary pilot valve 114 or with the lines 129, and 131 and hence with exhaust.

The secondary servo ram 104 is a double acting ram comprising a cylinder 134 in which the piston 136 is slidable. A piston rod 138 is carried by the piston 136.

Motion of the piston rod 138 is returned to the differential beam 106 through link 140 pivotally connected to one end of a lever 141 the other end of which is fast on a shaft (not shown) journalled between a pair of fixed brackets 143 (only one shown). A lever 145 is fast at one end to said shaft and at its other end is pivotally connected to a link 108 which carries a pin 150 engaging in an arcuate slot 148. This slot is formed in a crank arm 146 of the lever 142 which is pivoted on a fixed axis 144. The position of the link pin 150 of the link 108 in the slot 148 can be adjusted to alter the transmission ratio. This ratio change is effected by adjustment to hydroplane gain and limit mechanism 151 comprising screw means 153 connected by a link 155 to the link 108. By this mechanism 151 the link 108 may be raised or lowered. In full gain it requires the full stroke of the piston 136 to move the end of the differential beam 106, coupled to cranked lever 142 through a distance equal to the full phase advance output and, therefore, the full output motion of the phase advancer 66 covers the full range of the hydroplane. In 25% gain it requires only the middle quarter of the stroke of the piston 136 to move the said end of the differential beam 106 through a distance equal to the full phase advancer output and, therefore, the hydroplane movement is limited to this range.

Figure 5:
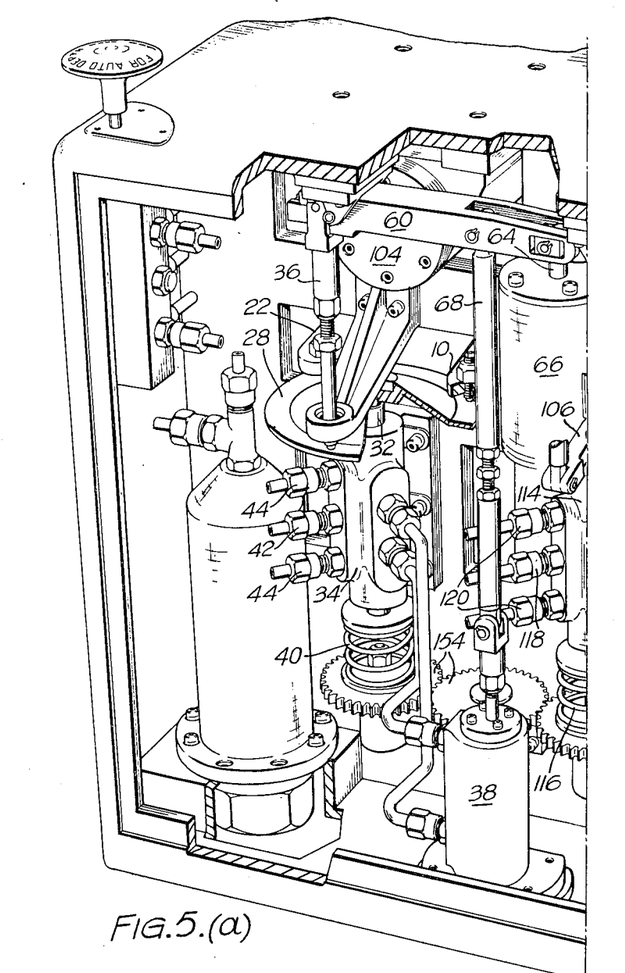

To eliminate frictional resistance to axial movement of the plungers 32 and 112 of the pilot valves 34 and 114 said plungers are rotated by a motor 152 (FIGURE 5) driving a gear train 154. Certain of the gears of this train carry the springs 40 and 116 which transmit rotary movement to the plungers 32 and 112.

The automatic mechanism hereinbefore described is for depth control and serves to maintain a submarine sailing or cruising at a selected depth or if it is desired to bring about a change of depth of sailing this may be done automatically by appropriately adjusting the downward force applied by the spring 12 to the fore arm 18 and the main pendulum 2. To this end the screw adjustment mechanism would be provided with an appropriately marked dial. It thus follows that if the submarine is cruising at a depth of 400 ft. and it is required to bring it to 200 ft. this is achieved simply by turning the dial from indicating a reading of 400 ft. to a reading of 200 ft. and the submarine will automatically come up to this new depth. Any error of depth from the selected depth is sensed in the bellows 14 so that the resultant force between the pressure in the bellows 14 and the spring 12 acts to cause movement of the pendulum 2 and hence the summation disc 28.

Considering the summation disc 28, the motion of the primary servo ram 38 is fed back to the disc 28. The object of this is to displace the primary servo ram by an amount proportional to the sum of the movements of the main pendulum 2 and the auxiliary pendulum 18. Suppose everything is in its central position with the summation disc horizontal and then both aft arms 10 and 22 of the pendulums 2 and 18 move down a few thousandths of an inch each. At this stage the return motion rod 36 is restrained against movement so the summation disc pivots about its point of contact with the bottom end thereof, with the result that the plunger 32 of the pilot valve 34 moves down a third of the sum of the downward movements of the two arms 10 and 22. The top end of the primary servo ram 38 is thus brought into communication with fluid pressure and the bottom end with exhaust so that the piston 58 of the ram moves down, pivoting the beam 60 and thereby lifting the return motion rod 36. As the return motion rod 36 lifts, the spring 40 pushes the plunger 32 up until it is again in its neutral position shutting off communication between fluid pressure and the top of the primary servo ram 38, and between exhaust and the bottom end thereof. This movement stops when the upward movement of the return motion rod 36 is equal to the sum of the downward movement of the two arms 10 and 22. The primary servo ram is, therefore, displaced proportionally to the sum of the movements of the main pendulum 2 and auxiliary pendulum 18.

The upward movement of the aft arm 10 of the main pendulum 2 is proportional to $h+L_1 \sin \theta$, where $h$ is the height error in feet of the submarine above the selected level and $\theta$ is the bow up pitch of the submarine, in degrees. The upward movement of the aft arm 22 of the auxiliary pendulum 18 is proportional to $L_2 \sin \theta$. Thus in normal operation the upward movement of the primary servo ram 38 is proportional to $h+(L_1+L_2) \sin \theta$, which is the height error at a point $(L_1+L_2)$ feet forward on the axis of the submarine.

If the hydroplanes of the submarine were to be positioned at all times in proportion to $h+(L_1+L_2) \sin \theta$, it would follow that a sudden change in depth setting of H feet would lay on an initial pitch angle of $$\sin^{-1} \frac{H}{L_1+L_2}$$

which might be unacceptably large.

The function of the pitch limiting stops 26 is to limit the movement of the aft arm 10 of the main pendulum 2 at something below $\mp S$. However large the change in set depth the main pendulum comes up against one of the stops 26 and only the auxiliary pendulum is free to control the pitch. The hydroplanes re-centre when $L_2 \sin \theta = S$, that is when the pitch is $$\sin^{-1} \frac{S}{L_2}$$

and that pitch is maintained until the new depth is approached and the submarine levels out.

By adjusting the stops 26 the pitch angle can be limited to any desired value.

From the foregoing description it will be appreciated that any error of depth from the selected depth at a point $(L_1+L_2)$ feet forward along the axis of the submarine is sensed by the two pendulums and the summation disc 28 is appropriately displaced. As a result the primary servo ram 38 is displaced proportionally as is the piston 74 of the phase advancer 66. This results in displacement of the differential beam 106 and the plunger 112 of the second pilot valve 114 whereby fluid pressure is applied to the appropriate side of the piston 136 of the servo actuator 104 so that the piston rod 138 is appropriately displaced to cause actuation of the mechanism operating the hydroplanes, whereby they are adjusted so that the submarine rises or sinks to bring it back to the selected depth. The phase advancer 66 serves to provide phase advance so that the system is stable.

As previously mentioned, if it is desired to bring about a change of depth at which the submarine is cruising this is achieved simply by adjusting the depth setting dial whereby the force exerted by the spring 12 of the fore arm 8 of the main pendulum 2 is adjusted and the submarine thereafter automatically will come up or down to the newly selected depth.

The automatic pilot mechanism according to the present invention may also include an automatic steering mechanism which is similar to the depth control mechanism described above except the first primary pilot valve (steering) is especially designed to be pre-set by a rotatable sleeve and fed back by a gyro compass repeater and also the primary servo ram. In the following description referring to FIGURE 2, like reference numerals designated by a (') will be used to identify those components of the steering mechanisms similar to components of the depth control mechanism.

Figure 2:
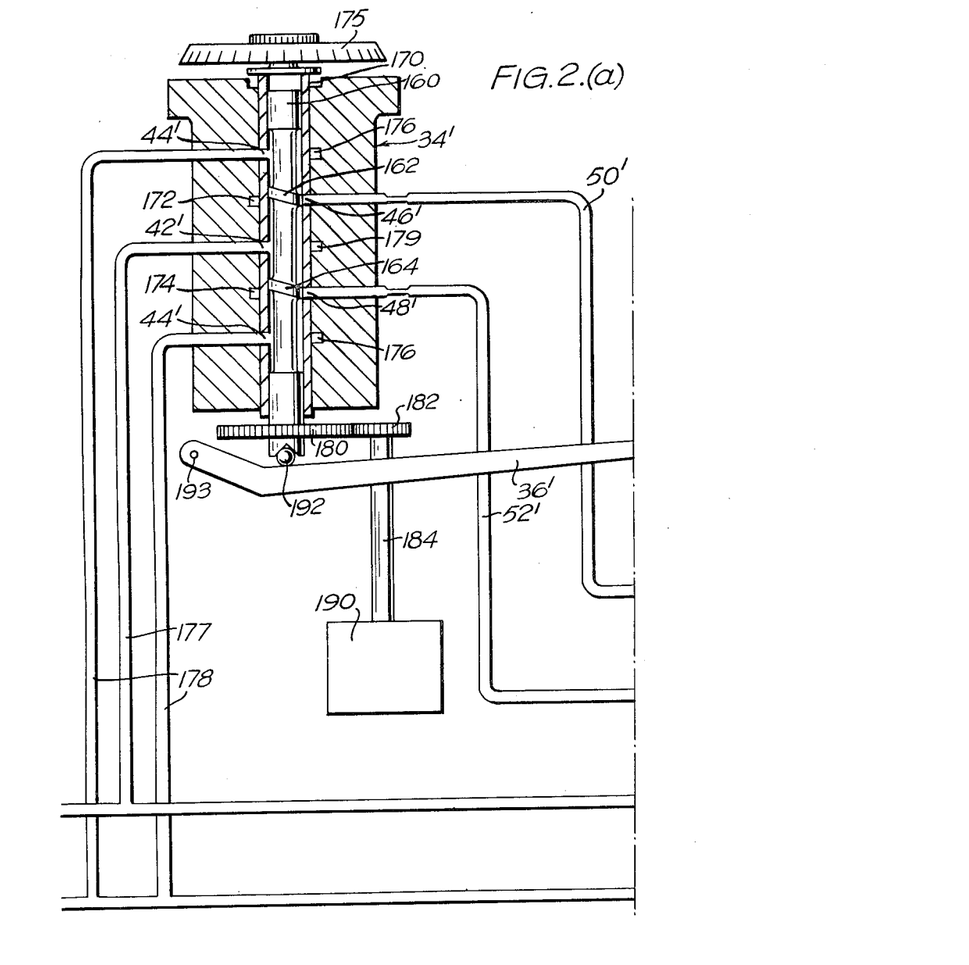
FIGURES 2(a), 2(b) and 2(c), considered connected together, constitute a schematic diagram of the steering control mechanism of the automatic pilot. These figures, in connected relation, will hereinafter be referred to as "FIGURE 2,"

A primary pilot valve 34' comprises a plunger 160 formed with two control lands 162 and 164. Each land consists of one complete turn of square section at an angle to the axis of the plunger 160, with an axial filler joining the ends and completing the seal across the land.

The plunger 160 is slidable and rotatably mounted in a sleeve 170 in which the control ports 46' and 48' are formed. The port 46' communicates with an annular groove 172 cut in the bore of the body of the valve 34' and the port 48' communicates with an annular groove 174. These grooves 172 and 174 communicate respectively with fluid lines 50' and 52' leading to the annular side and full area side of the piston 58' in the primary servo ram 38'.

The sleeve 170 is also formed with ports 44' which communicate with grooves 176 formed in the body of the valve 34', which grooves 176 connect with fluid flow lines 178 leading to exhaust. A fluid pressure inlet port 42' in the sleeve 170 communicates with an annular groove 179 which is connected to a fluid pressure inlet line 177.

A steering setting dial 175 is fast on the top end of the rotatable sleeve 170.

At the bottom of the plunger 160 is a spur gear wheel 180 meshing with a gear 182 on a shaft 184 turned by a gyro compass repeater 190. The spur gear wheel 180 is keyed to the bottom end of the plunger so that said plunger can slide axially with respect to the spur gear.

A ball 192 received in a socket at the base of the plunger 160 bears against the return motion lever 36', which at one end is attached to a fixed pivot 193 and at its other end 194 bears against an abutment shoulder 195 carried by the piston rod 68' of the primary servo ram 38'. This piston rod 68' is pivotally attached to a beam 60' mounted on a fixed pivot 62'. The piston rod 64' of the phase advancer 66' is pivotally coupled to the beam 60'.

The phase advancer 66' comprises a body 70' formed with a cylinder 72' in which a piston 74', connected to the piston rod 64', can slide. Bellows 76' are contained in the bottom end of the cylinder 72', a fixed plate 78' of the bellows closing the bottom of the cylinder 72'. A top free end plate 80' of the bellows carries an output rod 82' formed with a stop 84'. A compression coil spring 86' is trapped between the fixed end plate 78' and the free plate 80' of the bellows 76'. A compression coil spring 90' is trapped between the piston 74' and the free end plate 80'. The combined rate of the spring 86' and the bellows 76' is several times stiffer than the spring 90'. The top of the cylinder 72' is in communication with the bottom of the cylinder through a fluid passage way 92' provided with a throttle plug 94'. A passage (not shown) by-passes a relief valve spring biased to a closed position (not shown).

The construction of the phase advancer in the automatic steering mechanism is the same as that of the phase advancer of the automatic depth control mechanism hereinbefore described. Likewise the operation of the two phase advancers is the same.

The output rod 82' of the phase advancer 66' is coupled to one end of the differential beam 106', the other end of which is coupled to a cranked lever 142' of a return motion linkage of the rudder control servo actuator 104. The differential beam 106' is balanced at its centre on a steel ball 110' on the top of a plunger 112' of a secondary pilot valve 114'. The plunger 112' is biased upwardly by a compression coil spring 116'. This secondary pilot valve 114' is provided with a fluid pressure inlet port 118' and fluid exhaust ports 120'. The valve 114' also is provided with fluid outlet ports 122' and 124' connected to fluid lines 126' and 128' respectively, which through a plunger on/off valve 123' communicate with lines 125' and 127' leading to the full area side and the annular side of a piston 136' in the secondary servo ram 104'. The plunger 112' of the secondary pilot valve 114' has annular chambers 130' separated by lands 132'. Referring to FIGURE 2, it will be seen that if the plunger 112' moves up, one end of the secondary servo ram 104' is connected to fluid pressure and the other is connected to exhaust, so that the ram actuates the rudder mechanism for a port or starboard turn, and that the reverse occurs when the plunger 112' moves down. Fluid lines 129' and 131' leading to exhaust are connected to the on/off valve 123' which includes a plunger 133' formed with annular chambers 135'. By appropriately positioning the plunger 133', the lines 125' and 127' may be brought into communication with the lines 126' and 128' and hence the secondary pilot valve 114', or with the lines 129' and 131' and hence with exhaust.

The secondary servo ram 104' is a double connecting ram comprising a cylinder 134' in which the piston 136' is slidable. A piston rod 138' is carried by the piston 136' and is connected to the rudder operating mechanism.

Motion of the piston rod 138' is returned to the differential beam 106' through link 140', pivotally connected to one arm 141' of a cranked lever pivoted about a fixed axis 139', the other arm 145' of which lever is pivotally connected to a link 108'. A pin 150' carried by this lever 108' engages in an arcuate slot 148' formed in a crank arm 146' of the cranked lever 142' which is pivoted on a fixed axis 144'. The position of the link pin 150' in the slot 148' can be adjusted to alter the transmission ratio. This ratio change is effected by adjustment of rudder gain and limit mechanism 151' comprising screw means 153' connected by a link 155' to the link 108'. By this mechanism 151' the link 108' may be raised or lowered. In full gain it requires the full stroke of the piston 136' to move the end of the differential beam 106' coupled to the cranked lever 142' through a distance equal to the full phase advance output and, therefore, the full output motion of the phase advancer 66' covers the range of the rudder. In 25% gain it requires only the middle quarter of the stroke of the piston 136' to move the said end of the differential beam 106' through a distance equal to the whole phase advance output and, therefore, the rudder movement is limited to this range.

Figure 4:
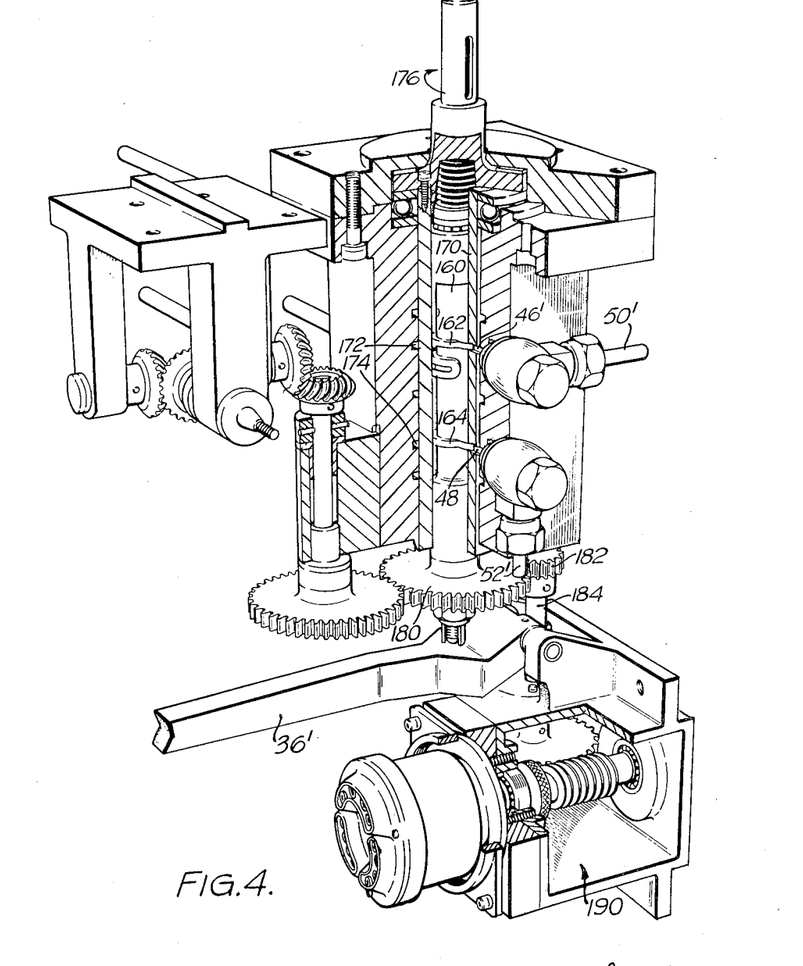
FIGURE 4 is a perspective view, with parts broken away, of the primary steering pilot valve and gyro repeater, and FIGURES 5(a) and 5(b), considered connected together, constitute a perspective view, with parts broken away, of the assembly of the automatic depth control mechanism and the automatic steering mechanism. These figures, in connected relation, will hereinafter be referred to as "FIGURE 5."

Returning to the primary pilot valve 34', the plunger 160 is turned by the gyro repeater 190 acting through the gears 180 and 182, the plunger turning one revolution for 360° of the submarine's heading. When the submarine is on the said course, the primary servo ram 38' is in mid position and lands 162 and 164 cover the control ports 46' and 48', the servo ram 38' remains stationary. If then the submarine wanders off course, so that its heading increases by one degree, the gyro compass repeater 190 turns the plunger 160 one degree clockwise (in the direction of the arrow 176 of FIGURE 4). This uncovers the ports 46' and 48' by just over .002", the pitch of the helical lines 162 and 164 being .750". Fluid pressure is thus connected below the piston 58' of the primary servo ram 38', whereby said ram is driven upwards from this mid position. This acts through the return motion lever 36' to lift the plunger 160 upwards by just over .002", whereby the ports 46' and 48' are closed and motion ceases. Thus the primary servo ram 38' is displaced from its mid position by an amount proportional to course error. It reaches limit of travel at course error of 25°. The primary servo ram 38' operates the input of the phase advancer 66'.

The primary servo ram 38' operates the input of the phase advancer 66' of the automatic steering mechanism which transmits a signal hydraulically and mechanically, through a second pilot valve 114' and steering servo actuator 104' to the rudder control of the submarine. The operation of the phase advancer, second pilot valve and steering servo actuator, of the steering mechanism is the same as hereinbefore described with reference to the automatic depth control mechanism.

To change course it is only necessary to turn the calibrated dial 175 to the new course and the submarine will follow.

It is envisaged that with the automatic pilot mechanism according to the present invention either only the automatic depth control or the automatic steering control may be used, the other, as the case may be, being under manual control, or if desired, both may be used simultaneously or not at all. Furthermore, the automatic steering mechanism may be used by itself in a surface craft.

An essential feature of the present automatic pilot mechanism is the provision of the phase advancers which serve to anticipate the required movements of the submarine's rudder and hydroplanes to maintain the submarine on its set course. If, for example, the rudder of the submarine were positioned simply in proportion to the course error, then on approaching the selected course the submarine would over-shoot due to its rotational inertia. The action of the phase advancer causes the rudder to reverse before the selected course is reached and so prevents over-shoot.

The same thing applies to the automatic depth control mechanism in that the hydroplanes are reversed before the submarine reaches the selected depth to kill rotational inertia and prevent over-shoot.

What I claim is:

1. An automatic pilot mechanism for a submarine having hydroplanes and a rudder, said mechanism comprising first responsive means responsive to deviation in depth course; a first servo actuator for adjusting and controlling the setting of the submarine's hydroplanes; mechanical and hydraulic means for effecting operation of said first servo actuator in accordance with the response of said first responsive means; a hydraulically operated phase advancer operatively connected to and between said first responsive means and said first servo actuator for anticipating the setting of the submarine's hydroplanes necessary to correct said deviation in depth course and for effecting operation of said first servo actuator in accordance with the setting anticipated by said phase advancer; second responsive means responsive to deviation in horizontal course; a second servo actuator for adjusting and controlling the setting of the submarine's rudder; mechanical and hydraulic means for effecting operation of said second servo actuator in accordance with the response of said second responsive means; and a second hydraulically operated phase advancer operatively connected to and between said second responsive means and said second servo actuator for anticipating the setting of the submarine's rudder necessary to correct the deviation in horizontal course and for effecting operation of said second servo actuator in accordance with the setting anticipated by said second phase advancer, each of said hydraulically operated phase advancers comprising an input member, an output member free from mechanical friction, and means interconnecting said members and being operable for moving said output member without friction in response to movement of said input member and in phase advance thereof.

2. An automatic pilot mechanism for a ship having settable control surfaces, said mechanism comprising responsive means responsive to deviation of the ship from a pre-selected path; a servo actuator for adjusting and controlling the setting of the ship's control surfaces; mechanical and hydraulic means for effecting operation of said servo actuator in accordance with the response of said responsive means; and a hydraulically operated phase advancer operatively connected to and between said responsive means and said servo actuator for anticipating the setting of the ship's control surfaces necessary to bring the ship on path and for effecting operation of said servo actuator in accordance with the setting anticipated by said phase advancer, said phase advancer comprising an input member, an output member free from mechanical friction, and means interconnecting said members and being operable for moving said output member without friction in response to movement of said input member and in phase advance thereof.

3. Mechanism according to claim 2 wherein said phase advancer comprises a cylinder and a fluid passageway connecting the two ends of said cylinder, said fluid passageway having a throttle therein; said input member comprises an input piston slidable in said cylinder; said output member comprises an output rod protruding into an end of said cylinder coaxial therewith and mounted for axial movement without friction in said end of said cylinder; and said interconnecting means comprises first spring means between said input piston and an end of said output rod, and bellows and second spring means between said end of said output rod and said end of said cylinder, said bellows and said second spring means having a combined rate several times stiffer than the rate of said first spring means.

4. Mechanism according to claim 3 wherein said phase advancer includes another fluid passageway connecting the two ends of said cylinder, said fluid passageways bypassing said throttle and both said fluid passageways having a pressure relief valve biased closed, one of said valves being openable to permit fluid flow in one direction and the other of said valves being openable to permit fluid flow in the opposite direction.

5. An automatic pilot mechanism for a ship having settable control surfaces, said mechanism comprising responsive means responsive to deviation of the ship from a pre-selected path; a servo actuator comprising a hydraulic cylinder and a double acting piston slidable therein for adjusting and controlling the setting of the ship's control surfaces; mechanical and hydraulic means for effecting operation of said servo actuator in accordance with the response of said responsive means; and a hydraulically operated phase advancer operatively connected to and between said responsive means and said servo actuator for anticipating the setting of the ship's control surfaces necessary to bring the ship on path and for effecting operation of said servo actuator in accordance with the setting anticipated by said phase advancer, said phase advancer comprising an input member, an output member free from mechanical friction, and means interconnecting said members and being operable for moving said output member without friction in response to movement of said input member and in phase advance thereof; said mechanism including a pair of fluid flow lines leading respectively to opposite ends of said hydraulic cylinder; valve means for controlling flow of fluid through said flow lines; and means operatively connecting the output member of said phase advancer to said valve means.

6. Mechanism according to claim 5 including a source of fluid pressure and a fluid exhaust, and wherein said valve means comprises a housing member having a bore and ports opening into said bore and communicating respectively with said fluid flow lines and with said source of fluid pressure and said exhaust; and a plunger mounted to slide in said bore and being formed with annular recesses separated by lands, said plunger being positionable for selectively closing said fluid flow lines or connecting one thereof to the source of fluid pressure and the other to exhaust.

7. Mechanism according to claim 6 including a differential beam; means pivotally connecting said output member of said phase advancer to one end of said differential beam; a return motion linkage connecting the other end of said differential beam to said piston of said servo actuator; and spring means biasing said valve plunger with one end thereof bearing against said differential beam between said ends thereof.

8. Mechanism according to claim 5 wherein said responsive means comprises a primary pilot valve, said mechanism further including a primary fluid pressure operable servo ram; pressure fluid flow means providing communication between said primary pilot valve and said primary fluid pressure operable servo ram; and means operatively connecting said primary fluid pressure operable servo ram to said input member of said phase advancer.

9. Mechanism according to claim 8 wherein said primary pilot valve comprises a plunger formed with two axially spaced lands each consisting of one complete turn at an angle to the axis of said plunger; a rotatable sleeve in which said plunger is slidably and rotatably mounted; and a housing member in which said sleeve is rotatably mounted, said sleeve being formed with ports and said housing member being formed with annular chambers with which said ports communicate; said mechanism including fluid flow lines connecting said annular chambers to said primary fluid pressure operable servo ram, whereby, according to the positioning of said plunger in said sleeve and the angular positioning of said sleeve, said fluid flow lines may be closed, or one connected to a source of fluid pressure and the other to exhaust.

10. Mechanism according to claim 9 including a gyro compass repeater; and gearing connecting said gyro compass repeater to said plunger of said primary pilot valve for displacing the latter angularly in response to actuation of said gyro compass repeater.

11. Mechanism according to claim 10 including a calibrated course setting dial carried by said rotatable sleeve.

12. Mechanism according to claim 9 wherein said primary fluid pressure operable servo ram includes a piston rod with an abutment thereon, said mechanism including a fixed pivot; and a return motion lever pivoted thereon and engaging said abutment, one end of primary pilot valve plunger bearing against said return motion lever.

13. Mechanism according to claim 8 in which said responsive means is responsive to deviation in depth course and in which said primary pilot valve is a primary depth control valve.

14. Mechanism according to claim 13 wherein said primary depth control valve includes a plunger formed with annular recesses separated by lands; and a housing member having ports and a bore in which said plunger is slidable, said mechanism including a pair of fluid flow lines communicating with said ports and with a source of fluid pressure and exhaust, whereby according to the positioning of said plunger said pair of flow lines may be closed or one connected to fluid pressure and the other to exhaust, the positioning of said plunger being in accordance with deviation in depth course.

15. Mechanism according to claim 14 including spring means for biasing said primary depth control valve plunger in one direction.

16. Mechanism according to claim 15 including a pendulum pivoted about a horizontal axis transverse to the ship's hull; depth setting means biasing said pendulum in one direction; depth sensing means biasing said pendulum in the opposite direction; and means coupling said pendulum to said primary depth control valve plunger whereby displacement of said pendulum from its normal position causes displacement of said plunger.

17. Mechanism according to claim 16 including a cross arm fast with said pendulum, and wherein said depth setting means includes a compression coil spring bearing at one end against said cross arm; and an adjustable screw bearing against the other end of said compression coil spring.

18. Mechanism according to claim 17 wherein said depth sensing means includes a bellows, open to sea pressure, acting on said cross arm against the action of said compression coil spring.

19. Mechanism according to claim 17 wherein said primary fluid pressure operable servo ram includes a piston rod, said mechanism including a summation disc pivoted at its center on the end of said primary depth control valve plunger remote from said biasing spring, said cross arm bearing against said summation disc; an auxiliary pendulum pivoted about a horizontal axis transverse to the ship's hull; a second cross arm fast with said auxiliary pendulum and bearing against said summation disc; and a return motion element coupled to said piston rod of said primary fluid pressure operated servo ram and bearing against said summation disc, said two cross arms and said return motion element bearing on said summation disc at points 120° apart and equidistant from the center thereof to restrain said disc against movement under the action of said biasing spring.

References Cited by the Examiner

UNITED STATES PATENTS 2,533,042  12/1950  Polson et al. __________ 91—384

FOREIGN PATENTS 453,928  12/1934  Great Britain.
609,805  10/1948  Great Britain.

MILTON BUCHLER, *Primary Examiner.*

ANDREW H. FARRELL, *Examiner.*